US011736962B2

(12) United States Patent
Patel et al.

(10) Patent No.: US 11,736,962 B2
(45) Date of Patent: Aug. 22, 2023

(54) METHODS, APPARATUS AND COMPUTER-READABLE MEDIUMS RELATING TO CONFIGURATION OF REDUNDANT PATHS

(71) Applicant: Telefonaktiebolaget LM Ericsson (publ), Stockholm (SE)

(72) Inventors: Dhruvin Patel, Aachen (DE); Hubertus Andreas Munz, Aachen (DE); Torsten Dudda, Wassenberg (DE); György Miklós, Pilisborosjenő (HU); Balázs Varga, Budapest (HU); János Farkas, Kecskemét (HU); Alexandros Palaios, Moers (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 331 days.

(21) Appl. No.: 17/294,867

(22) PCT Filed: Nov. 25, 2019

(86) PCT No.: PCT/SE2019/051188
§ 371 (c)(1),
(2) Date: May 18, 2021

(87) PCT Pub. No.: WO2020/112008
PCT Pub. Date: Jun. 4, 2020

(65) Prior Publication Data
US 2022/0014945 A1 Jan. 13, 2022

Related U.S. Application Data

(60) Provisional application No. 62/771,285, filed on Nov. 26, 2018.

(51) Int. Cl.
H04L 45/00 (2022.01)
H04W 24/04 (2009.01)
(Continued)

(52) U.S. Cl.
CPC ............ H04W 24/04 (2013.01); H04L 45/02 (2013.01); H04L 45/24 (2013.01); H04W 40/246 (2013.01); H04W 76/10 (2018.02)

(58) Field of Classification Search
None
See application file for complete search history.

(56) References Cited

PUBLICATIONS

3GPP, "3GPP TR 23.734 V0.3.0", 3rd Generation Partnership Project; Technical Specification Group Services and System Aspects; Study on 5GS Enhanced support of Vertical and LAN Services (Release 16), Oct. 2018, 1-97.
(Continued)

Primary Examiner — Abdelillah Elmejjarmi
(74) Attorney, Agent, or Firm — Murphy, Bilak & Homiller, PLLC

(57) ABSTRACT

A method performed by a core network node for a wireless communication network is provided. The method comprises: receiving a configuration message via an interface with a configuring node associated with a wired communication network, the configuration message comprising settings for a plurality of paths between a first node coupled to the wired communication network and a second node coupled to the wireless communication network, the plurality of paths carrying a plurality of data streams between the first and second nodes, the plurality of data streams comprising at least one redundant data stream; and configuring the plurality of paths within the wireless communication network according to the settings.

14 Claims, 10 Drawing Sheets

(51) Int. Cl.
*H04W 76/10* (2018.01)
*H04L 45/02* (2022.01)
*H04L 45/24* (2022.01)
*H04W 40/24* (2009.01)

(56) References Cited

PUBLICATIONS

3GPP, "3rd Generation Partnership Project; Technical Specification Group Services and System Aspects; System Architecture for the 5G System; Stage 2 (Release 15)", 3GPP TS 23.501 V15.3.0, Sep. 2018, 1-226.

Huawei, et al., "update to Solution#3 and Solution#4", SA WG2 Meeting #129Bis, S2-1812087, (revision of S2-18xxxx), West Palm Beach, USA, Nov. 26-30, 2018, 1-13.

Huawei, et al., "Updates on Solution #18", 3GPP TSG-SA WG2 Meeting #129Bis, S2-1812232, West Palm Beach, USA, Nov. 26-Nov. 30, 2018, 1-8.

Nokia, et al., "Key Issue #1—Updates to Solution #7", SA WG2 Meeting #129bis, S2-1811834 (was S2-181xxxx), West Palm Beach, USA, Nov. 26-30, 2018, 1-7.

METHODS, APPARATUS AND COMPUTER-READABLE MEDIUMS RELATING TO CONFIGURATION OF REDUNDANT PATHS

TECHNICAL FIELD

Embodiments of the disclosure relate to methods, apparatus and computer-readable mediums for configuration of redundant paths in a communication network, and particularly to methods, apparatus and computer-readable mediums for configuration of redundant paths between a first node coupled to a wired communication network and a second node coupled to a wireless communication network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Future mobile communication systems aim to support communications in fields such as the industrial manufacturing domain. Compared to typical use cases of mobile communication traffic, such as phone calls and internet data, industrial manufacturing applications/service require higher reliability, availability, and low and deterministic latency. Other use cases may have similar requirements, such as remote surgery, autonomous vehicles, etc.

Such communication will typically travel via paths which traverse both wireless networks (e.g., cellular networks, such as those standardized by the Third Generation Partnership Project (3GPP): Long Term Evolution (LTE), New Radio (NR), etc) and wired networks (e.g. Ethernet networks, etc). Various efforts have been made to achieve high reliability, availability and low and deterministic in wired and wireless communication networks.

IEEE 802.1 time-sensitive networking (TSN) is based on the IEEE 802.3 Ethernet standard, so it is a wired communications standard. TSN describes a collection of features for, e.g., time synchronization, guaranteed low latency transmissions and high reliability to make Ethernet deterministic, which was used previously mostly for best-effort communications. The features can be grouped into the following categories:
  Time Synchronization (e.g., IEEE 802.1AS)
  Bounded Low Latency (e.g., IEEE 802.1Qav, IEEE 802.1Qbu, IEEE 802.1Qbv, IEEE 802.1Qch, IEEE 802.1Qcr)
  Ultra-Reliability (e.g., IEEE 802.1CB, IEEE 802.1Qca, IEEE 802.1Qci)
  Network Configuration and Management (e.g., IEEE 802.1Qat, IEEE 802.1Qcc, IEEE 802.1Qcp, IEEE 802.1CS)

TSN uses the concept of streams (or flows) for exchange of data between one or more talkers and one or more listeners. The talkers and listeners may also be called "end devices", i.e., the source and destination devices of the TSM streams. To configure a TSN stream, the listeners and talkers provide requirements to the TSN network which are used for scheduling and configuration decisions, e.g., how bridges (also known as switches or Ethernet switches) should behave between a listener and a talker.

The IEEE 802.1Qcc standard specifies three TSN configuration models: the fully distributed model; the centralized network and distributed user model; and the fully centralized model. For the industrial manufacturing use case, the fully centralized configuration model might be the most suitable. However, embodiments of the disclosure may alternatively use the fully distributed model or the centralized network and distributed user model.

For the fully centralized configuration model, the Central User Configuration (CUC) and Central Network Configuration (CNC) are logical functions rather than actual physical nodes in the network. The CUC is the entity which is responsible for configuration of the listeners and the talkers. The CNC is the entity that configures the TSN features in the bridges in the network.

The 5G system (5GS) architecture as described in TS 23.501, v 15.3.0 specifies the support of Ethernet protocol data unit (PDU) sessions. The medium access control (MAC) address for this PDU session is not provided by the 5G system.

For Ethernet PDU session setup, the session management function (SMF) and the user plane function (UPF) act as PDU session anchors. Also, based on the configuration, the SMF may request the UPF acting as the PDU session anchor to redirect address resolution protocol (ARP) traffic from UPF to the SMF. Also, UPF is supposed to store MAC addresses received from the User Equipment (UE), and associate those with the appropriate PDU session.

Moreover, for quality of service (QoS) provisioning, the SMF provides Ethernet Packet Filter Set and forwarding rules based on the Ethernet frame structure and user equipment MAC address.

The Application Function (AF) in 3GPP system architecture is a functional node, which interacts with the 3GPP core network to provide services as for example:
  Application influence on traffic routing (TS 23.501, v 15.3.0, clause 5.6.7).
  Accessing Network Exposure Function (TS 23.501, v 15.3.0, clause 5.20).
  Interacting with policy control framework for policy control (TS 23.501, v 15.3.0, clause 5.14).

Further, the AF can trigger particular services towards UE, for example PDU session modification. Further details on application triggering services is described in TS 23.501, v 15.3.0, clause 4.4.5.

SUMMARY

Currently there is no mechanism on how to configure redundant TSN streams over 5GS. The current 3GPP standards support different ways to increase reliability of transmissions, such as dual or multi connectivity (DC), carrier aggregation (CA) and packet duplication. However, there is no interfacing or communication defined between the 5GS and the TSN network about how to set up redundancy (which might use those methods of increasing transmission reliability).

As a use case example, interworking between 5GS and TSN networks is highly relevant for an industrial network deployment. Unfortunately, this type of seamless internetworking is not feasible with current networks.

Certain aspects of the present disclosure and their embodiments may provide solutions to these or other challenges.

For example, in one aspect the disclosure provides a method in a core network node for a wireless communication network. The method comprises: receiving a configuration message via an interface with a configuring node associated with a wired communication network, the configuration message comprising settings for a plurality of paths between a first node coupled to the wired communication network and a second node coupled to the wireless communication network, the plurality of paths carrying a plurality of data streams between the first and second nodes, the plurality of data streams comprising at least one redundant data stream; and configuring the plurality of paths within the wireless communication network according to the settings.

In another aspect, the disclosure provides a method in a configuring node for a wired communication network. The method comprises: transmitting a request message via an interface with a core network node for a wireless communication network, the request message comprising a request for information related to a topology of the wireless communication network; and receiving an information message via the interface with the core network node, the information message comprising information related to the topology of the wireless communication network.

Certain embodiments may provide one or more of the following technical advantage(s): End-to-end deterministic packet transport over TSN and 5GSs; TSN stream redundancy features configuration over 5GS; and seamless integration into the architecture of the 5G core network.

The description of wireless communication networks is in the context of 5G networks, using LTE and/or NR. Embodiments of the disclosure may alternatively relate to other wireless communication networks, particularly cellular networks such as those standardized by 3GPP.

BRIEF DESCRIPTION OF THE DRAWINGS

For a better understanding of the present disclosure, and to show how it may be put into effect, reference will now be made, by way of example, to the accompanying drawings, in which.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
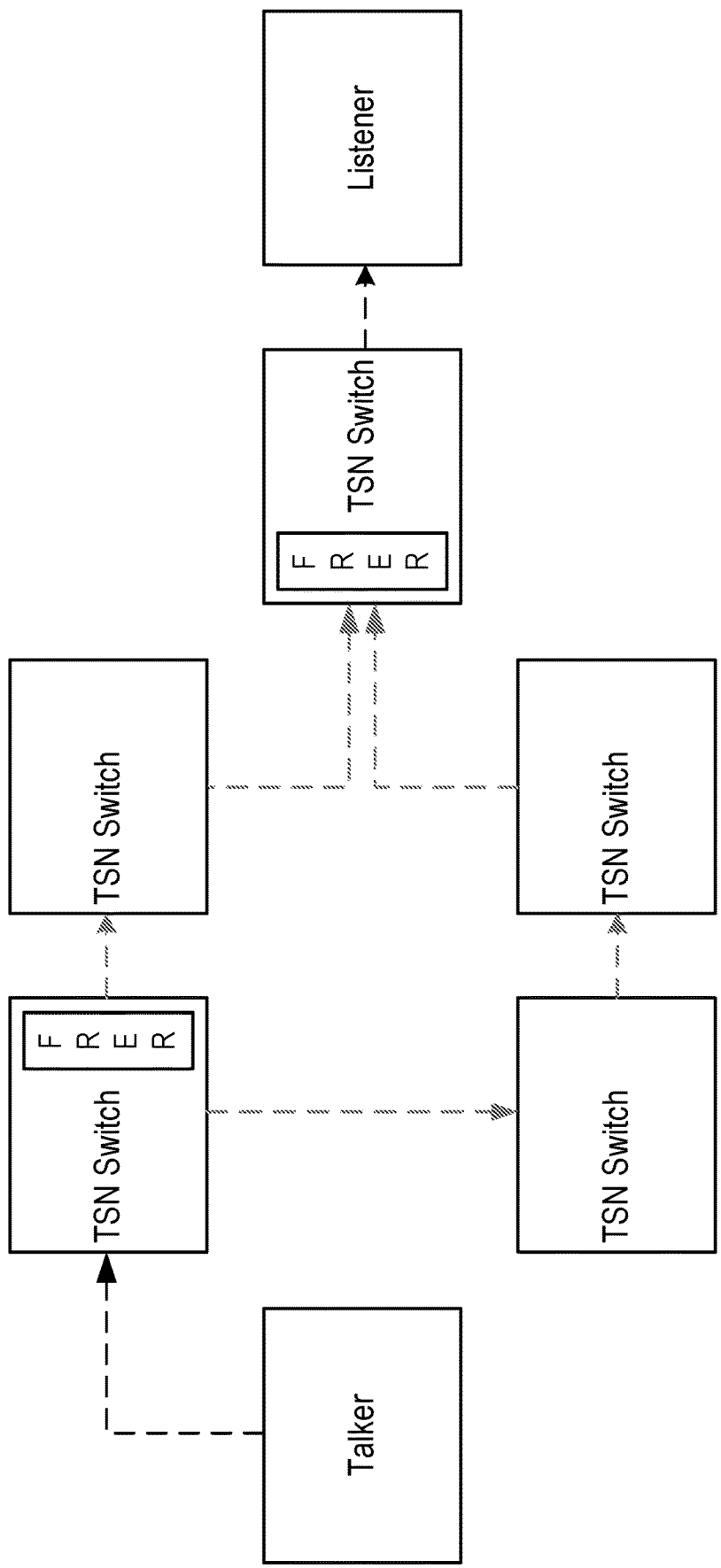
FIG. 1 shows transmission of TSN data streams using redundant paths.

FIG. 1 shows transmission of TSN data streams using redundant paths.

In the future, it is envisioned, that 5G will support TSN features and will transport TSN streams, over 5G wireless links. This is highly relevant for industrial use cases, as TSN is expected to become a major communication technology in this sector. With the support of TSN traffic in the 5G network, wireless communication can be used, as a cable replacement, for industrial networks deployed with TSN. One of the important features of TSN is IEEE 802.1CB—Frame Replication and Elimination for Reliability, which enables redundant transmissions to increase reliability in case of failures in one of the transmitted paths appear.

This scenario is illustrated in FIG. 1. The grey arrows illustrate the duplicated frames across the network. Black arrows depict a single TSN stream. The Talker's stream is shown at the left, and the data stream that is delivered at the Listener at the right part of the Figure.

According to embodiments of the disclosure, an interface is proposed in the 5GS that enables such interactions with the TSN network. This interface at the 5G side can be part of the Application Function (AF) or another network entity (such as another core network node or function). One role of this new proposed interface is to interact with one or more nodes within a TSN network, such as for example the CNC, that configures the redundant paths of frames through the network, and to convert the requirements for the TSN streams into the relevant features over the 5GS.

Figure 2:
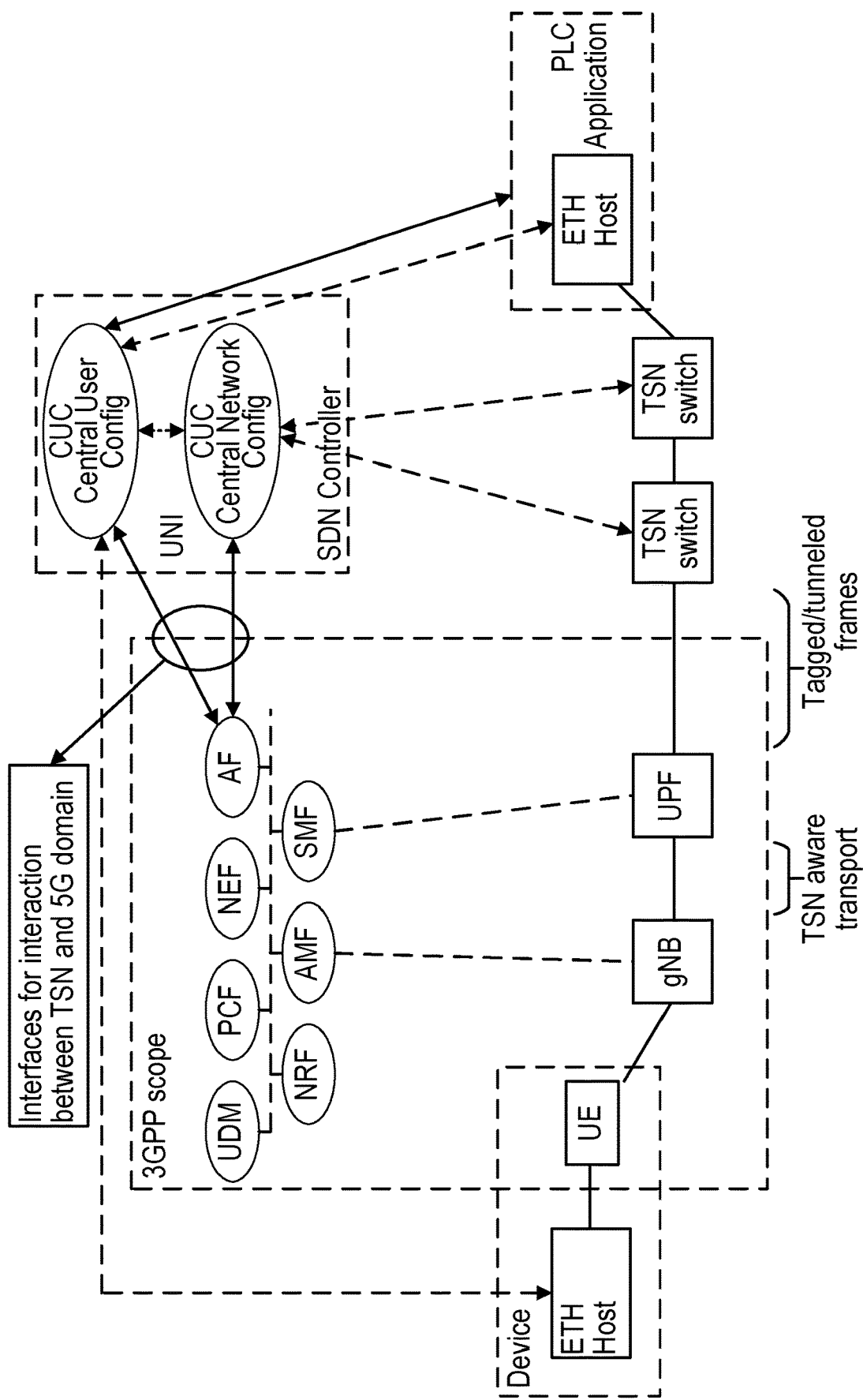
FIG. 2 shows a communication system according to embodiments of the disclosure.

FIG. 2 shows an example of such integration. The 5GS, by using the AF (or an alternative core network node or function as described above), acts as one or multiple TSN switches and is seen as one or more TSN switches by the CNC and other TSN switches in the TSN network.

The configuration of two independent data paths in TSN depends on the requirements from the application software (e.g., a programmable logic controller, PLC). The relevant configuration parameter may be "NumSeamlessTrees", specified in IEEE 802.1Qcc 46.2.3.6.1. If the value of this parameter is greater than one, then CNC needs to calculate and set-up maximally disjoint trees (for a value of 2 there are two almost disjoint trees).

Figure 4:
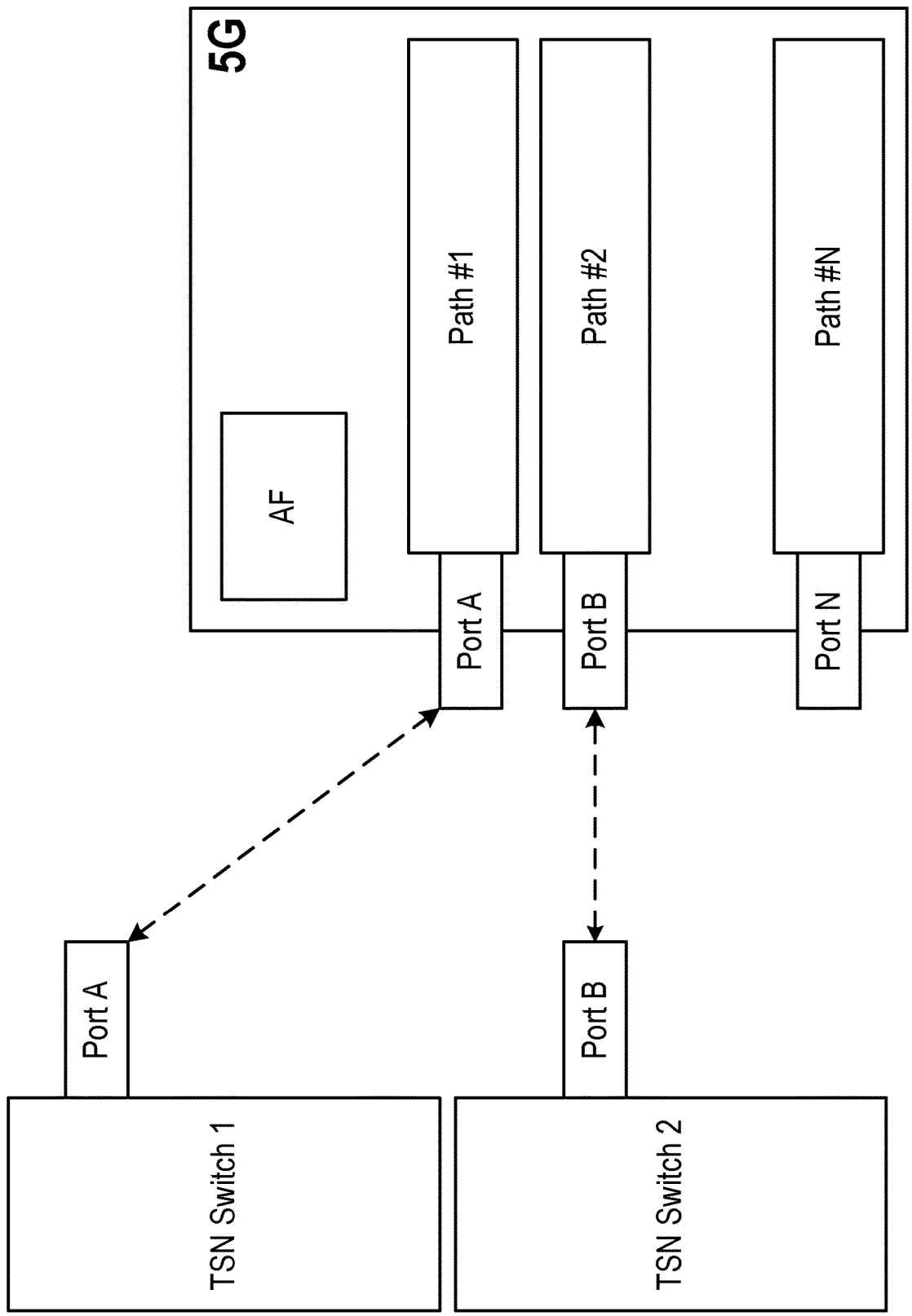
FIG. 4 is a schematic diagram showing redundant paths in a wireless network according to embodiments of the disclosure.
Figure 5:
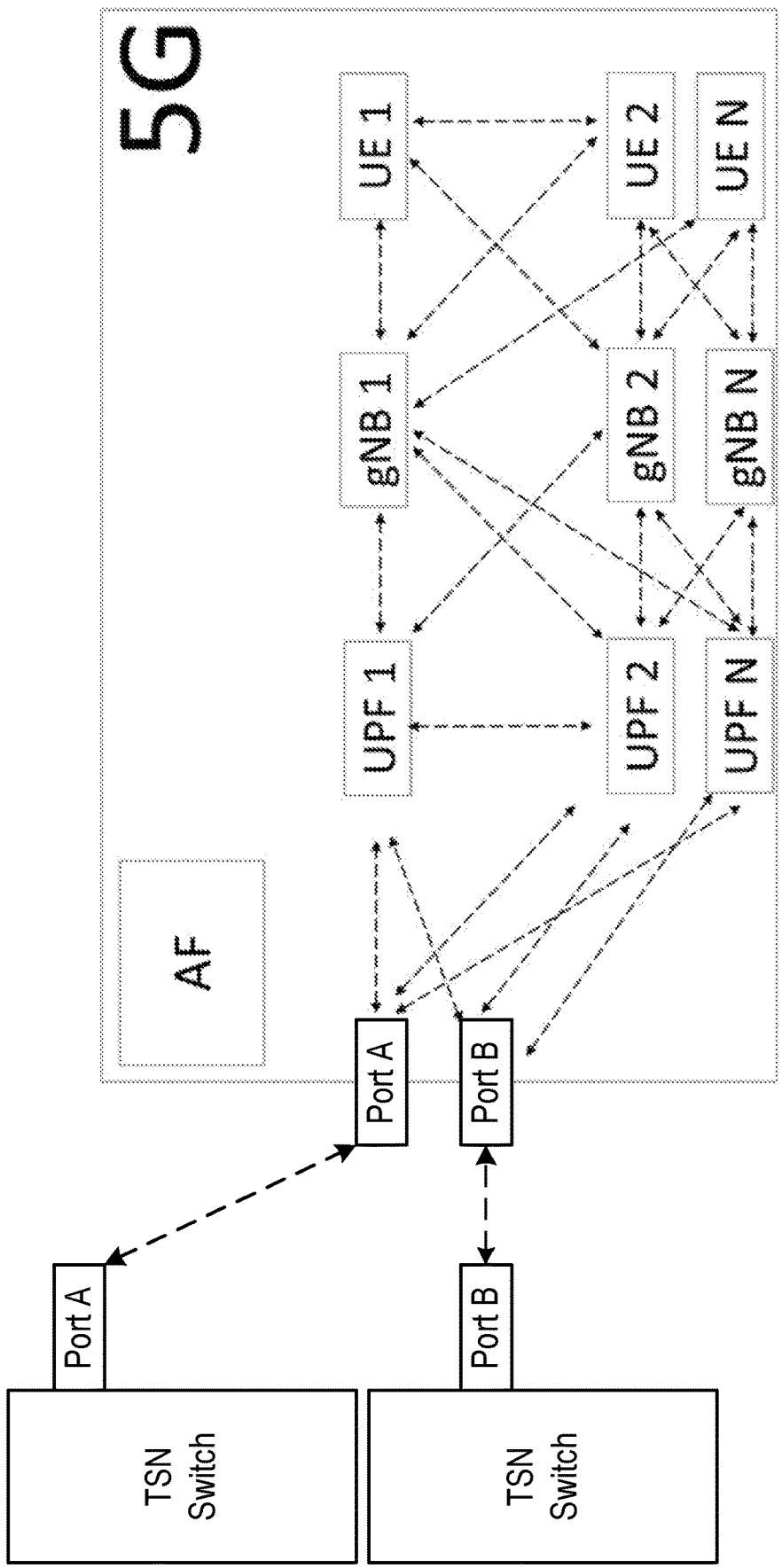
FIG. 5 is a schematic diagram showing redundant paths in a wireless network according to further embodiments of the disclosure.
Figure 6:
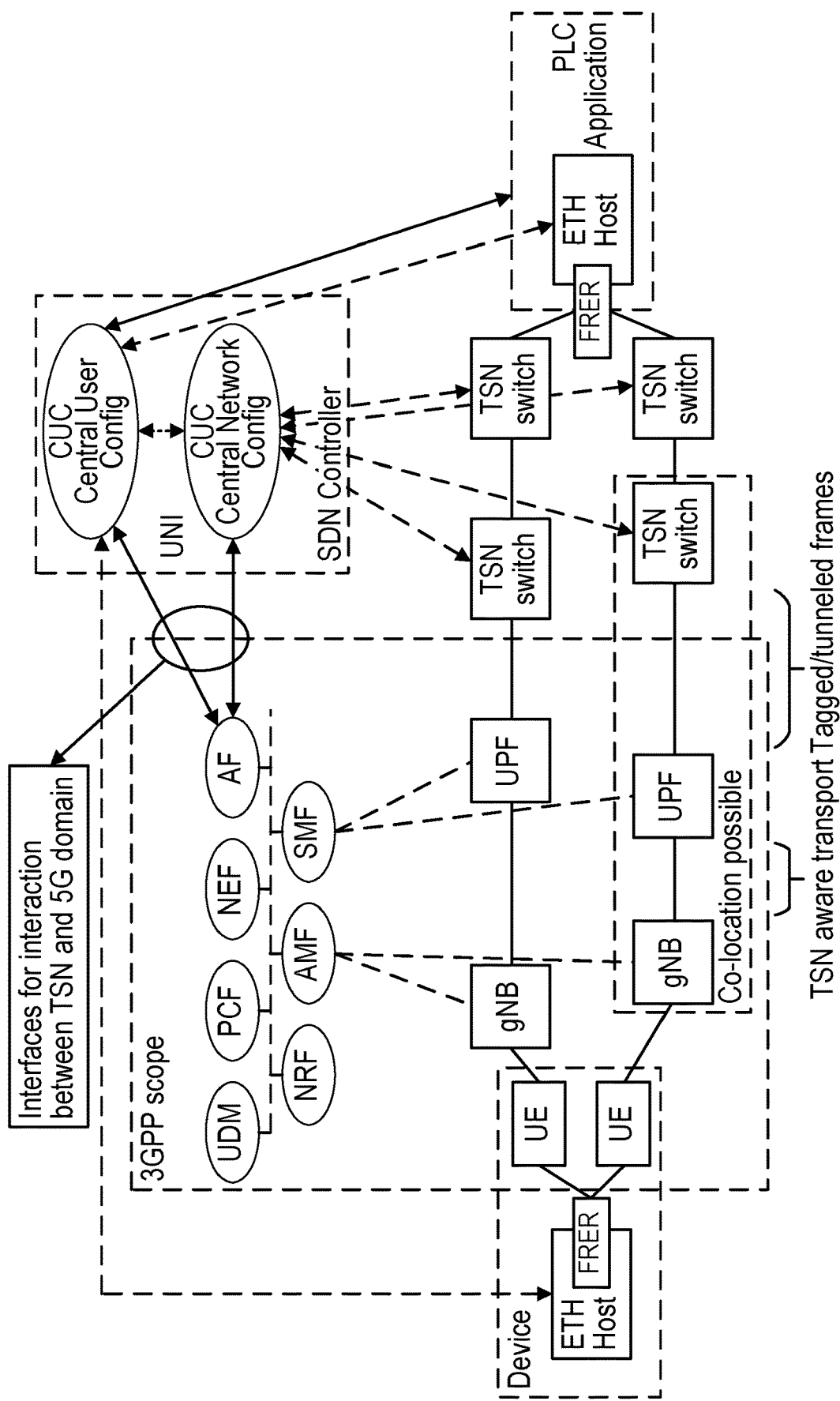
FIG. 6 is a schematic diagram showing redundant paths in a wireless network according to further embodiments of the disclosure.

In one embodiment of the disclosure, a 5G core network function (interacting with AF) determines if two independent paths (seamless trees) can be set up within the 5G network. To do this, a request might be sent to RAN, e.g. to a single gNB, or multiple gNBs. The 5G network can support redundancy of the transmitted packets (e.g., to increase reliability) by using one or multiple techniques from the 5G network. Suitable examples may include dual connectivity, carrier aggregation and duplication. In order to use redundant paths or multiple paths for TSN streams in a 5GS, two or more UEs can be attached to the same Ethernet network or device and used as an alternative to or in combination with other features for redundancy. FIGS. 4 to 6 gives various examples of redundant paths in a wireless network.

FIG. 6 shows an architecture where two UEs are used for redundancy reasons. FIG. 4 shows a 5GS simulating different TSN paths. FIG. 5 provides more insights on how these multiple paths can be simulated by showing some of the possible 5G permutations on enabling such increased redundancy.

For example, in the simplest case both incoming redundant streams are forwarded over the same UPF, gNB and UE. The UE might forward them to multiple redundant TSN nodes.

This scenario might be applicable if the 5GS is assumed to be reliable enough without using physical redundancy. Another option would be to use redundancy only in the radio network but using a single UPF in the core network—or a single UE but dual connectivity. Those skilled in the art will appreciate that there are multiple options.

According to some embodiments of the disclosure, how redundancy is supported in the 5GS is not exposed to the external TSN network; in such embodiments, the only thing that is communicated through the AF may be whether and to what degree redundancy is supported (e.g., how many redundant paths or what the redundant topology looks like).

As noted above, embodiments of the disclosure provide a new interface that enables the functionality to set up and enable end-to-end redundancy between a wired communication network (such as a TSN network) and a wireless communication network (such as a 5G network).

FIG. 2 shows a communication system according to embodiments of the disclosure, and particularly shows this interaction between the 5GS and TSN is depicted for the fully centralized approach to TSN networking discussed above with respect to FIG. 1.

The scenario in FIG. 2 assumes that the AF is part of the wireless network domain. An interface for communication between the wireless network and the wired network is proposed. In terms of improving clarity we provide an example between the AF and CNC although this type of interaction can also take place at other parts/entities of both networks. A device in the TSN network might be a Talker and the device connected to the 5G network might be the Listener. In other embodiments this scenario might be different, e.g., the Talker might be in the wireless network (e.g., 5GS) and the Listener in the wired network (e.g., TSN)

Figure 3:
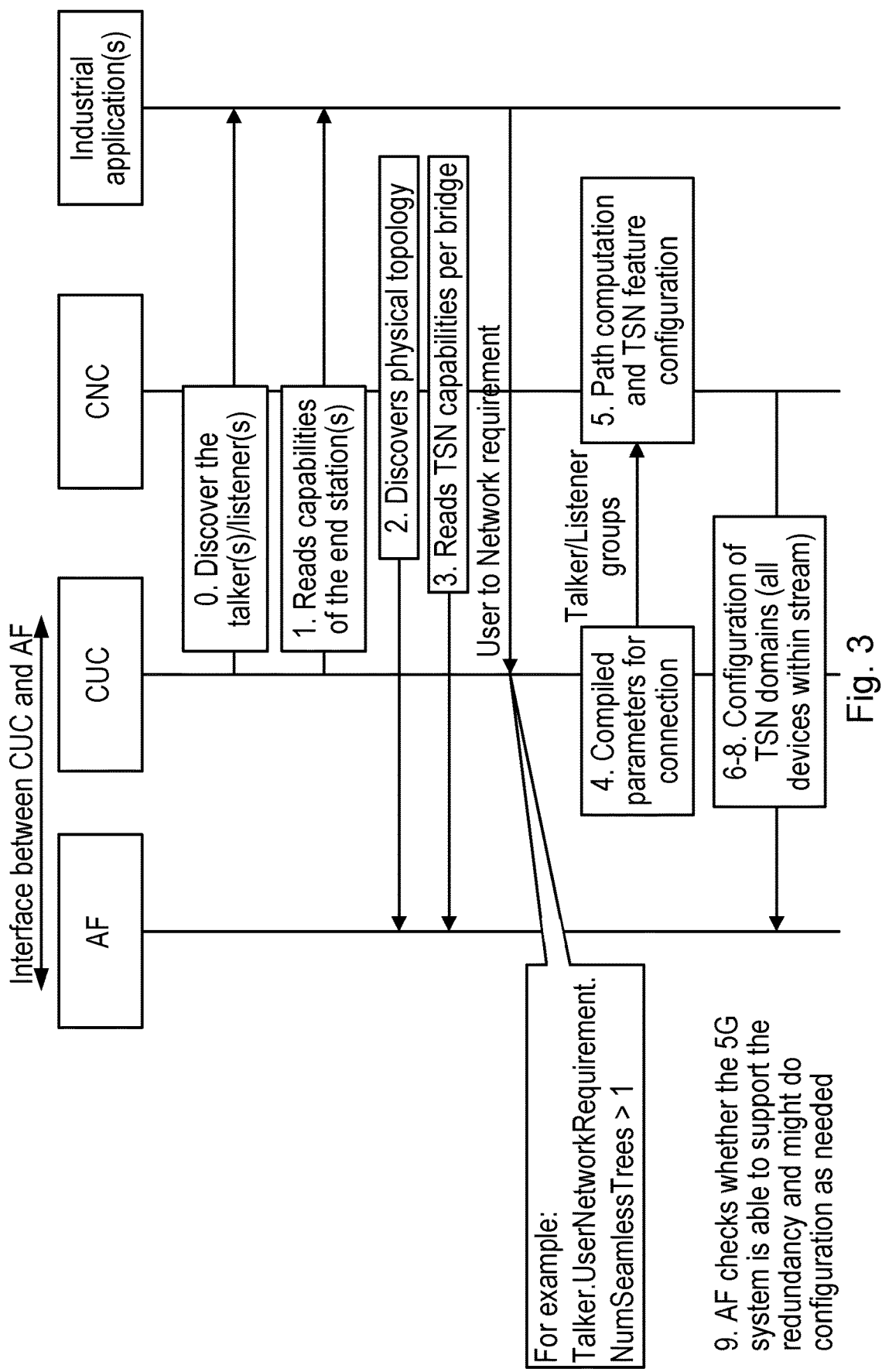
FIG. 3 is a signalling diagram according to embodiments of the disclosure.

FIG. 3 is a signalling diagram according to embodiments of the disclosure, showing the interaction between the AF and the CNC. The sequence of the interaction to setup the TSN flow is as follows.

0. 5GS connects to a TSN network and might use link layer discovery protocol (LLDP) or another suitable management protocol (e.g., simple network management protocol, SNMP, Network Configuration Protocol, NETCONF, Representational State Transfer Configuration Protocol, RESTCONF) to discover TSN bridges in the TSN network and reply to LLDP requests by TSN bridges 1. PLC initiates the communication by providing device ID and possibly a public 3GPP identifier (e.g., mobile station international subscriber directory number, MSISDN) to CUC or other addresses, like MAC addresses. The message sent to the CUC or other addresses may include one or more of the following information content:
    i. Payload size of the data being transferred between sensors and actuators with device ID
    ii. Time interval
    iii. 3GPP UE public identifier (MSISDN) (optional)
2. CNC discovers the physical topology of the network (e.g., the network nodes and the links between them). To discover the physical links between end stations and Bridges, the CNC might use IEEE Std 802.1AB (for example LLDP) and/or any remote management protocol.
    In one embodiment of the disclosure, the AF answers a topology request and advertises multiple paths across the 5GS to be able to satisfy any redundancy needs. The multiple paths may comprise two or more paths. Redundant paths in the 5GS can be advertised with different topologies internally as well, for example as a single TSN switch or as multiple TSN switches per path.
    This advertisement can be made by knowing all the relevant 5G mechanisms that can support increased transmission reliability, such as PDCP duplication and/or multi UE connectivity, transport and core network and function redundancy—this may include complete physical redundancy in the 5GS end-to-end.
    As a further embodiment the disclosure, the redundancy can also be simulated towards the TSN network. The 5GS can simulate multiple paths and then enable the relevant mechanisms to support the needed reliability—the AF will announce these simulated disjoint paths as legal disjoint paths toward the CNC.
    If the AF has announced multiple paths to the CNC, they can be dynamically changed or modified internally but at the same time they may be static towards the CNC. For established streams these paths should not change as long a specific stream agreement is valid.
3. The CNC, based on the information retrieved from the network (including the topology information from the AF) and from the CUC, and for a specific PLC application, generates TSN configuration parameters that may include one or more of:
    Traffic specification: e.g. specifying how the Talker transmits frames for the stream
    StreamID
    User to Network Requirement: specifying one or more user requirements for the stream such as latency and redundancy The above and additional parameters are being specified in IEEE 802.1Qcc, clause 46.2.3. Such configuration information can also be collected and created within different TSN configuration models such as the centralized and the distributed user approach.

4. CUC creates Talker group and Listener group and creates a join request to CNC.
5. CNC receives the join request and performs path computation of TSN stream (including paths through the 5GS from edge bridge to end stations). The computation algorithm is not specified in the standard, and those skilled in the art will appreciate that multiple methods and algorithms for computing paths exist. The present disclosure is not limited in that respect. Such algorithms may seek to minimize or maximize one or more network performance metrics, for example, such as network throughput, overall network latency, path latency, etc.

Path computation comprises computing paths used for transmitting frames from Talker to Listener including 5G paths.

CUC also allocates for each stream a unique identifier (streamID) including destination MAC address, VLAN ID and PCP (priority code point), and communicates StreamID to CNC.

6. CNC provides output for the scheduling settings. This scheduling and path settings are returned to CUC via status group (IEEE 802.1 Qcc, 46.2.5).

7. CNC configures path setting in bridges via management protocols as for example netconf or Yet Another Next Generation (YANG) managed objects in the bridges as specified in IEEE 802.1Q These settings define how a switch forwards a packet
In one embodiment the AF gets this configuration information from the CNC and knows about the paths that have been set and is aware about the redundancy—it uses this information to enable and ensure redundancy features 8. If the status group does not contain any failure code, CNC provides configuration settings to AF.

9. AF converts the TSN configuration settings for the 5GS, triggers PDU session modification and further provides SMF with relevant forwarding rules and packet filter set which are further used by SMF to configure UPF forwarding rules and packet filter set. This may include knowledge about which paths have been selected by the CNC for forwarding stream traffic in the 5GS; this knowledge might be used by the 5GS to route streams accordingly.

The description above has focused on the interactions between the CNC, the CUC and the AF (or other core network node or function). In embodiments where the TSN network does not use central coordination (i.e., no CNC and no CUC are present), the methods described in this disclosure can be applied in a similar manner, but the AF will talk to the switches (e.g., TSN switches) connected to the 5GS directly.

FIG. 4 is a schematic diagram showing redundant paths in a wireless network according to embodiments of the disclosure. It can be seen that the redundant paths may arrive at the 5GS from multiple switches in the wired network, and be directed to corresponding paths in the wireless network.

FIG. 5 is a schematic diagram showing redundant paths in a wireless network according to further embodiments of the disclosure. The redundant paths are shown in more detail, and may comprise one or more elements in common (e.g., a single element in the wireless network may be utilized in more than one path). In an extreme example of this, the paths may comprise two or more paths which are identical to each other (e.g., the same data is transmitted more than once via the same physical or virtual path). The paths may also comprise one or more elements which are distinct from each other (e.g., two or more paths may be different in one or more respects). For example, the paths may comprise one or more of: a different core network node or function (such as the user plane function illustrated in FIG. 5); a different radio access network node (such as the gNodeB shown in FIG. 5); and a different terminal device (such as the UE shown in FIG. 5). The paths may thus comprise two or more paths which are maximally disjoint, and/or entirely disjoint.

FIG. 6 is a schematic diagram showing redundant paths in a wireless network according to further embodiments of the disclosure, and includes the most detail. In this embodiment, two redundant paths are shown, which are disjoint between the Talker and the Listener (i.e., between the Ethernet hosts in the PLC and the device which it controls). Each Ethernet host comprises a frame replication and elimination for reliability (FRER) module which permits frames to be replicated (i.e. at the Talker or transmitting device) and de-duplicated or eliminated (e.g. at the Listener or receiving device).

Figure 7:
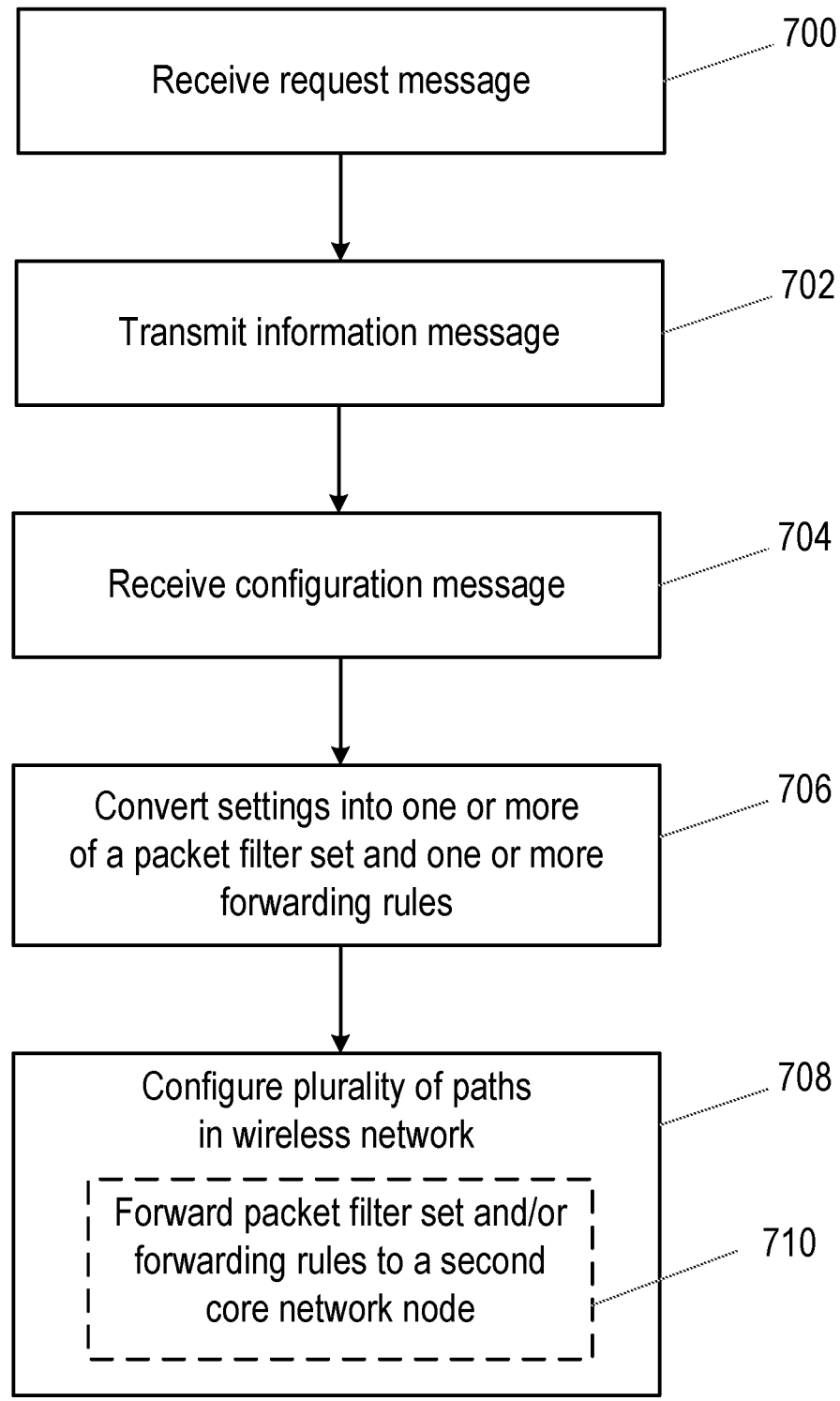
FIG. 7 is a flow chart of a method in a core network node according to embodiments of the disclosure.

FIG. 7 is a flow chart of a method in a core network node or function according to embodiments of the disclosure. The core network node may perform the signalling and functions of the AF described above with respect to one or more of FIGS. 2, 3 and 6, for example, and therefore may comprise or implement an application function (AF). As noted above, however, this functionality may be implemented in alternative core network nodes or functions. Further, the steps set out below and with respect to FIG. 7 may be performed in more than one core network function.

In step 700, the core network node receives a request message from a configuring node associated with a wired communication network (e.g., a CNC or a TSN switch as described above). The request message may be configured according to LLDP, SNMP, NETCONF, RESTCONF or any suitable network management protocol. The request message may comprises a request for information related to a topology of the wireless communication network, e.g., identities of one or more nodes in the wireless communication network, the links between those nodes, the capabilities of those nodes to enable redundant paths, etc.

In step 702, the core network node transmits an information message to the configuring node comprising information related to the topology of the wireless communication network. For example, the information message may comprise an indication of the ability of the wireless network to provide redundant paths. The information message may comprise an indication of a number of paths which can be configured in the wireless communication network to a particular end point or device (which may have been identified in the request message). The information message may also be configured via LLDP, SNMP, NETCONF, RESTCONF or any suitable management protocol.

In step 704, the core network node receives a configuration message from the configuring node. The configuration message comprises settings for a plurality of paths between a first node coupled to the wired communication network and a second node coupled to the wireless communication network. For example, the settings may include a set of associations between an input port and an output port for each of the plurality of paths, i.e. instructions for which output port data from respective input ports is to be forwarded to. See FIGS. 4 and 5, for example. The plurality of paths carry a plurality of data streams between the first and second nodes, comprising at least one redundant data stream.

In one embodiment, the plurality of paths comprise a first path and a second path which have at least one element in common with each other in the wireless communication network. For example, in one embodiment the first path and the second path are identical in the wireless communication network.

In another embodiment, the plurality of paths comprise a third path and a fourth path (which may be in addition to or as alternatives to the first and second paths disclosed above) which have at least one element not in common with each other in the wireless communication network. For example, the third path and the fourth path may be disjoint paths in the wireless communication network, or maximally disjoint paths in the wireless communication network. The at least one element not in common between the third and fourth paths may comprise one or more of: a user equipment; a radio access network node; and a core network node or function. The third and fourth paths may utilize a dual connectivity mechanism between a user equipment and multiple radio access network nodes, and/or a carrier aggregation mechanism between a user equipment and one or more radio access network nodes.

The paths may comprise one or more physical paths and/or one or more virtual paths.

In step 706, the core network node converts the settings in the configuration message into one or more of: a packet filter set and one or more forwarding rules. For example, the AF may perform this function or, alternatively, it may forward the settings to another core network node or function, such as the policy control function (PCF) to perform this function. The AF or PCF may be configured with information as to how redundancy is to be supported in the wireless communication network (e.g., using any of the techniques described above). The PCF or AF may request this information (i.e. how those redundant paths are actually setup in the wireless communication network—from a CNC point of view this is irrelevant. Internally some wireless network functions might only be virtually redundant, e.g. only one UPF is used).

In step 708, the core network node configures the plurality of paths within the wireless communication network according to the settings. Optionally, particularly where the settings have been converted into one or more of a packet filter set and forwarding rules in step 706, this may comprise forwarding the packet filter set and/or the forwarding rules to a second core network node (e.g., an SMF). For example, the AF (or PCF) may signal to the SMF to set up modify PDU sessions if that is required, to support the redundancy based on the AF input and the information about how redundancy is supported in the 5GS. The SMF will then modify PDU sessions in UPF(s) accordingly.

In further embodiments, the AMF is informed how redundancy has to be setup in the RAN according to the input from AF and the 5GS internal information about how redundancy is supported.

Figure 8:
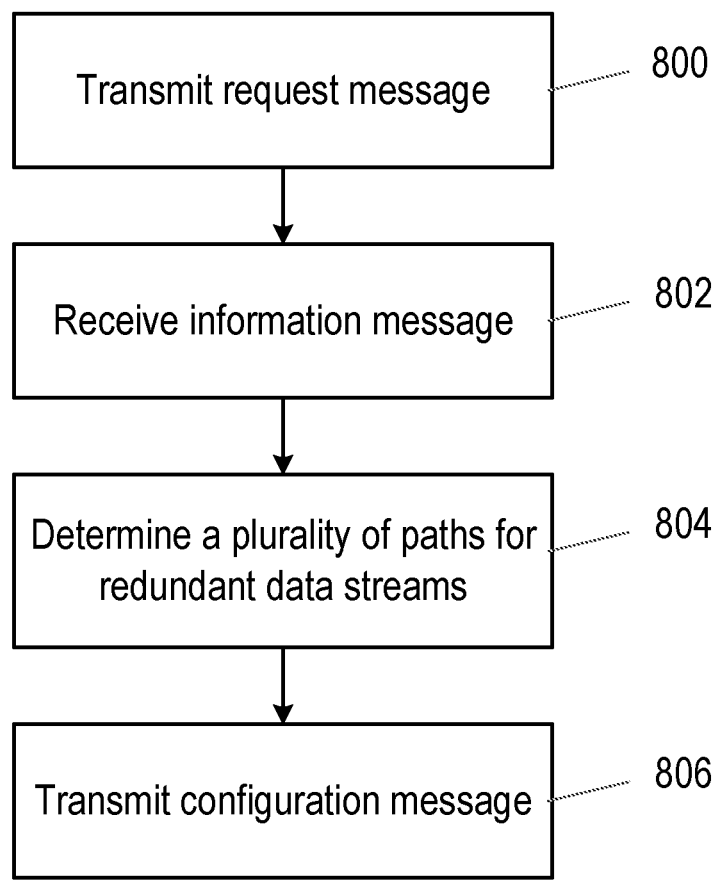
FIG. 8 is a flow chart of a method in a configuring node according to embodiments of the disclosure.

FIG. 8 is a flow chart of a method in a configuring node according to embodiments of the disclosure, the configuring node associated with a wired communication network such as an Ethernet network. The configuring node may perform the signalling and functions of the CNC and/or the CUC functions described above with respect to one or more of FIGS. 2, 3 and 6, for example, and therefore may comprise or implement a CNC and/or a CUC. In alternative embodiments, however, particularly where the wired network is not centrally configured (and thus no CNC or CUC is present), the configuring node may comprise a switch of the wired network (e.g., a TSN switch).

Further, the steps set out below and with respect to FIG. 8 may be performed in more than one network node or function.

In step 800, the configuring node transmits a request message to a core network node associated with a wireless communication network (e.g., an AF as described above). The request message may be configured according to LLDP, SNMP, NETCONF, RESTCONF or any suitable network management protocol. The request message may comprise a request for information related to a topology of the wireless communication network, e.g., identities of one or more nodes in the wireless communication network, the links between those nodes, the capabilities of those nodes to enable redundant paths, etc.

In step 802, the configuring node receives an information message from the core network node comprising information related to the topology of the wireless communication network. For example, the information message may comprise an indication of the ability of the wireless network to provide redundant paths. The information message may comprise an indication of a number of paths which can be configured in the wireless communication network to a particular end point or device (which may have been identified in the request message). The information message may also be configured via LLDP, SNMP, NETCONF, RESTCONF or any suitable management protocol.

In some embodiments, the redundant paths through the wireless communication network may not themselves be made known in the information message. That is, the configuring node may be unaware of how the redundant paths are established in the wireless communication network, or of the redundancy techniques which are employed in the wireless network to achieve that redundancy and increase in reliability (e.g., dual connectivity, packet duplication, carrier aggregation, etc). However, the information message may comprise an indication of the number of redundant paths which can be supported in the wireless communication network, for example.

In step 804, the configuring node determines a plurality of paths for redundant data streams between a first node coupled to the wired communication network and a second node coupled to the wireless communication network. The plurality of paths carry a plurality of data streams between the first and second nodes, comprising at least one redundant data stream.

In one embodiment, where the configuring node is unaware of the precise paths within the wireless communication network, this step may assume that the entire wireless communication network is equivalent to one or more TSN bridges.

In step 806, the configuring node transmits a configuration message to the core network node, comprising settings for each of the plurality of paths. For example, the settings may include a set of associations between an input port and an output port for each of the plurality of paths, i.e. instructions for which output port data from respective input ports is to be forwarded to. See FIGS. 4 and 5, for example.

Figure 9:
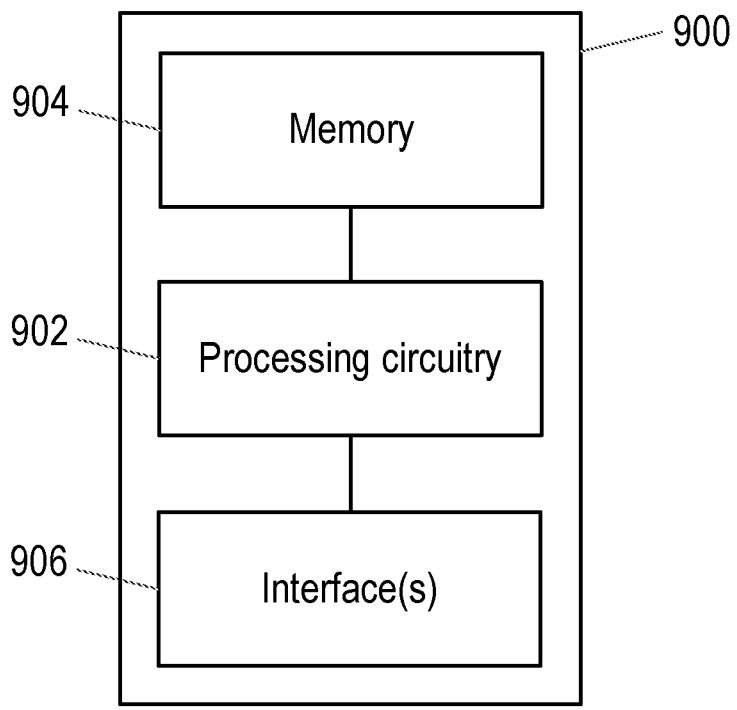
FIG. 9 is a schematic diagram of a core network node according to embodiments of the disclosure.

FIG. 9 is a schematic diagram of a core network node 900 according to embodiments of the disclosure. The core network node may perform the signalling and functions of the AF described above with respect to one or more of FIGS. 2, 3 and 6, for example, and therefore may comprise or implement an application function (AF).

As noted above, however, this functionality may be implemented in alternative core network nodes or functions. The core network node may additionally or alternatively be configured to perform the method described above with respect to FIG. 7.

The node 900 comprises processing circuitry 902 (such as one or more processors, digital signal processors, general purpose processing units, etc), a computer-readable medium (e.g., memory such as read-only memory (ROM), random-access memory, cache memory, flash memory devices, optical storage devices, etc) 904 and one or more interfaces 906. The components are illustrated coupled together in series;

however, those skilled in the art will appreciate that the components may be coupled together in any suitable manner (e.g., via a system bus or suchlike).

According to embodiments of the disclosure, the computer-readable medium 904 stores instructions which, when executed by the processing circuitry 902, cause the node 900 to: receive a configuration message via an interface with a configuring node associated with a wired communication network, the configuration message comprising settings for a plurality of paths between a first node coupled to the wired communication network and a second node coupled to the wireless communication network, the plurality of paths carrying a plurality of data streams between the first and second nodes, the plurality of data streams comprising at least one redundant data stream; and configure the plurality of paths within the wireless communication network according to the settings.

In further embodiments of the disclosure, the node 900 may comprise power circuitry (not illustrated). The power circuitry may comprise, or be coupled to, power management circuitry and is configured to supply the components of node 900 with power for performing the functionality described herein. Power circuitry may receive power from a power source. The power source and/or power circuitry may be configured to provide power to the various components of node 900 in a form suitable for the respective components (e.g., at a voltage and current level needed for each respective component). The power source may either be included in, or external to, the power circuitry and/or the node 900. For example, the node 900 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 10:
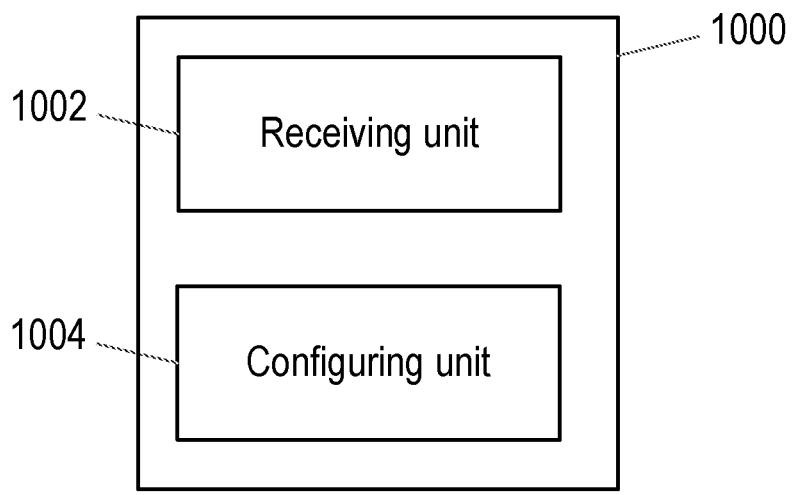
FIG. 10 is a schematic diagram of a core network node according to further embodiments of the disclosure.

FIG. 10 is a schematic diagram of a core network node 1000 according to further embodiments of the disclosure. The core network node may perform the signalling and functions of the AF described above with respect to one or more of FIGS. 2, 3 and 6, for example, and therefore may comprise or implement an application function (AF). As noted above, however, this functionality may be implemented in alternative core network nodes or functions. The core network node may additionally or alternatively be configured to perform the method described above with respect to FIG. 7.

The node 1000 comprises a receiving unit 1002 and a configuring unit 1004. The receiving unit 1002 is configured to receive a configuration message via an interface with a configuring node associated with a wired communication network. The configuration message comprises settings for a plurality of paths between a first node coupled to the wired communication network and a second node coupled to the wireless communication network. The plurality of paths carry a plurality of data streams between the first and second nodes, comprising at least one redundant data stream. The configuring unit 1104 is configured to configure the plurality of paths within the wireless communication network according to the settings.

Figure 11:
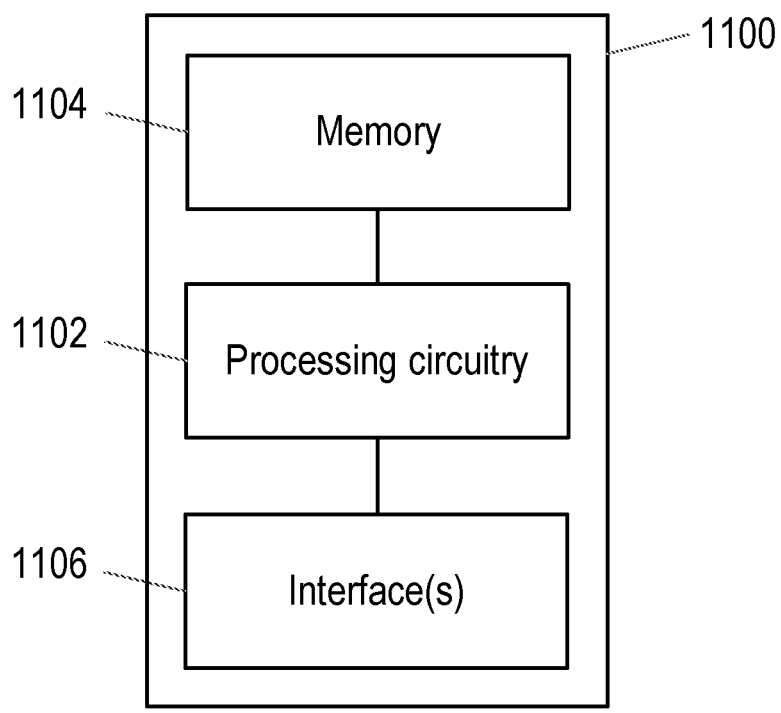
FIG. 11 is a schematic diagram of a configuring node according to embodiments of the disclosure.

FIG. 11 is a schematic diagram of a configuring node 1100 according to embodiments of the disclosure. The configuring node may perform the signalling and functions of the CNC and/or the CUC functions described above with respect to one or more of FIGS. 2, 3 and 6, for example, and therefore may comprise or implement a CNC and/or a CUC. In alternative embodiments, however, particularly where the wired network is not centrally configured (and thus no CNC or CUC is present), the configuring node may comprise a switch of the wired network (e.g., a TSN switch). The configuring node may additionally or alternatively be configured to perform the method described above with respect to FIG. 8.

The node 1100 comprises processing circuitry 1102 (such as one or more processors, digital signal processors, general purpose processing units, etc), a computer-readable medium (e.g., memory such as read-only memory (ROM), random-access memory, cache memory, flash memory devices, optical storage devices, etc) 1104 and one or more interfaces 1106. The components are illustrated coupled together in series; however, those skilled in the art will appreciate that the components may be coupled together in any suitable manner (e.g., via a system bus or suchlike).

According to embodiments of the disclosure, the computer-readable medium 1104 stores instructions which, when executed by the processing circuitry 1102, cause the node 1100 to: transmit a request message via an interface with a core network node for a wireless communication network, the request message comprising a request for information related to a topology of the wireless communication network; and receive an information message via the interface with the core network node, the information message comprising information related to the topology of the wireless communication network.

In further embodiments of the disclosure, the node 1100 may comprise power circuitry (not illustrated). The power circuitry may comprise, or be coupled to, power management circuitry and is configured to supply the components of node 1100 with power for performing the functionality described herein. Power circuitry may receive power from a power source. The power source and/or power circuitry may be configured to provide power to the various components of node 1100 in a form suitable for the respective components (e.g., at a voltage and current level needed for each respective component). The power source may either be included in, or external to, the power circuitry and/or the node 1100. For example, the node 1100 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 12:
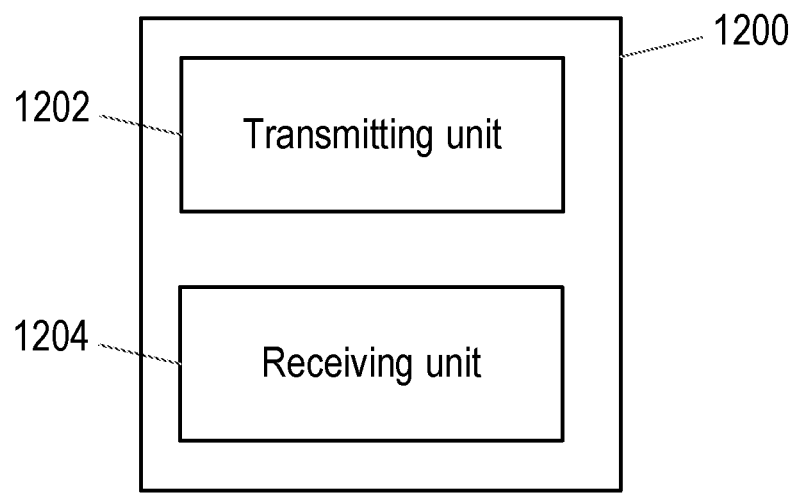
FIG. 12 is a schematic diagram of a configuring node according to further embodiments of the disclosure.

FIG. 12 is a schematic diagram of a configuring node 1200 according to further embodiments of the disclosure. The configuring node may perform the signalling and functions of the CNC and/or the CUC functions described above with respect to one or more of FIGS. 2, 3 and 6, for example, and therefore may comprise or implement a CNC and/or a CUC. In alternative embodiments, however, particularly where the wired network is not centrally configured (and thus no CNC or CUC is present), the configuring node may comprise a switch of the wired network (e.g., a TSN switch). The configuring node may additionally or alternatively be configured to perform the method described above with respect to FIG. 8.

The node 1200 comprises a transmitting unit 1202 and a receiving unit 1204. The transmitting unit 1202 is configured to transmit a request message via an interface with a core network node for a wireless communication network. The request message comprises a request for information related to a topology of the wireless communication network. The receiving unit 1204 is configured to receive an information message via the interface with the core network node. The information message comprises information related to the topology of the wireless communication network.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

For the avoidance of doubt, the following numbered statements set out embodiments of the disclosure:

1. A method in a core network node for a wireless communication network, the method comprising:
   receiving a configuration message via an interface with a configuring node associated with a wired communication network, the configuration message comprising settings for a plurality of paths between a first node coupled to the wired communication network and a second node coupled to the wireless communication network, the plurality of paths carrying a plurality of data streams between the first and second nodes, the plurality of data streams comprising at least one redundant data stream; and
   configuring the plurality of paths within the wireless communication network according to the settings.
2. The method according to embodiment 1, further comprising:
   receiving a request message via the interface with the configuring node, the request message comprising a request for information related to a topology of the wireless communication network
3. The method according to embodiment 2, wherein the request message is one of:
   a Link Layer Discovery Protocol message; a Simple Network Management Protocol message; a Network Configuration Protocol (NETCONF) message and a Representational State Transfer Configuration Protocol (RESTCONF) message.
4. The method according to any one of the preceding embodiments, further comprising:
   transmitting an information message via the interface with the configuring node, the information message comprising information related to the topology of the wireless communication network
5. The method according to embodiment 4, wherein the information message further comprises an indication of a capability of the wireless communication network to provide multiple paths for redundant data streams.
6. The method according to any one of the preceding embodiments, further comprising:
   converting the settings, for each of the plurality of paths, into one or more of: a packet filter set; and one or more forwarding rules; and
   forwarding, for each of the plurality of paths, the one or more of the packet filter set and the one or more forwarding rules to a second core network node for the wireless communication network
7. The method according to embodiment 6, wherein the second core network node implements a session management function.
8. The method according to any one of the preceding embodiments, wherein the plurality of paths comprise a first path and a second path which have at least one element in common with each other in the wireless communication network.
9. The method according to embodiment 8, wherein the first path and the second path are identical in the wireless communication network.
10. The method according to any one of the preceding embodiments, wherein the plurality of paths comprise a third path and a fourth path which have at least one element not in common with each other in the wireless communication network.
11. The method according to embodiment 10, wherein the third path and the fourth path are disjoint paths in the wireless communication network.
12. The method according to embodiment 10 or 11, wherein the third path and the fourth path are maximally disjoint paths in the wireless communication network.
13. The method according to any one of embodiments 10 to 12, wherein the at least one element not in common between the third and fourth paths comprises one or more of: a user equipment; a radio access network node; and a core network node or function.
14. The method according to any one of embodiments 10 to 13, wherein the third and fourth paths utilize a dual connectivity mechanism between a user equipment and multiple radio access network nodes.
15. The method according to any one of embodiments 10 to 14, wherein the third and fourth paths utilize a carrier aggregation mechanism between a user equipment and one or more radio access network nodes.
16. The method according to any one of the preceding embodiments, wherein one or more of the plurality of paths is a physical path.
17. The method according to any one of the preceding embodiments, wherein one or more of the plurality of paths is a virtual path.
18. The method according to any one of the preceding embodiments, wherein the configuring node implements one or more of: a central user configuration function; and a central network configuration function.
19. The method according to any one of the preceding embodiments, wherein the configuring node is a software-defined networking, SDN, controller.
20. The method according to any one of embodiments 1 to 17, wherein the configuring node is a switch in the wired communication network.
21. The method according to any one of the preceding embodiments, wherein the core network node implements an application function.
22. The method according to any one of the preceding embodiments, wherein the wired communication network is an Ethernet network.
23. The method according to any one of the preceding embodiments, wherein the data streams comprise time-sensitive networking data streams.
24. The method according to any one of the preceding embodiments, wherein the wireless communication network comprises a cellular network.
25. A method in a configuring node for a wired communication network, the method comprising:
   transmitting a request message via an interface with a core network node for a wireless communication network, the request message comprising a request for information related to a topology of the wireless communication network; and receiving an information message via the interface with the core network node, the information message comprising information related to the topology of the wireless communication network.

26. The method according to embodiment 25, wherein the request message is one of: a Link Layer Discovery Protocol message; a Simple Network Management Protocol message; a Network Configuration Protocol (NETCONF) message and a Representational State Transfer Configuration Protocol (RESTCONF) message.

27. The method according to embodiment 25 or 26, wherein the information message further comprises an indication of a capability of the wireless communication network to provide multiple paths for redundant data streams.

28. The method according to any one of embodiments 25 to 27, further comprising:
receiving a request message from a first node coupled to the wired communication network, to establish a connection between the first node and a second node coupled to the wireless communication network; and
sending a configuration message via the interface with the core network node, the configuration message comprising settings for a plurality of paths between the first node and the second node, the plurality of paths carrying a plurality of data streams between the first and second nodes, the plurality of data streams comprising at least one redundant data stream.

29. The method according to embodiment 28, wherein the plurality of paths comprise a first path and a second path which have at least one element in common with each other in the wireless communication network.

30. The method according to embodiment 29, wherein the first path and the second path are identical in the wireless communication network.

31. The method according to any one of embodiments 28 to 30, wherein the plurality of paths comprise a third path and a fourth path which have at least one element not in common with each other in the wireless communication network.

32. The method according to embodiment 31, wherein the third path and the fourth path are disjoint paths in the wireless communication network.

33. The method according to embodiment 31 or 32, wherein the third path and the fourth path are maximally disjoint paths in the wireless communication network.

34. The method according to any one of embodiments 31 to 33, wherein the at least one element not in common between the third and fourth paths comprises one or more of: a user equipment; a radio access network node; and a core network node or function.

35. The method according to any one of embodiments 31 to 34, wherein the third and fourth paths utilize a dual connectivity mechanism between a user equipment and multiple radio access network nodes.

36. The method according to any one of embodiments 31 to 35, wherein the third and fourth paths utilize a carrier aggregation mechanism between a user equipment and one or more radio access network nodes.

37. The method according to any one of embodiments 28 to 36, wherein one or more of the plurality of paths is a physical path.

38. The method according to any one of embodiments 28 to 37, wherein one or more of the plurality of paths is a virtual path.

39. The method according to any one of embodiments 25 to 38, wherein the configuring node implements one or more of: a central user configuration function; and a central network configuration function.

40. The method according to any one of embodiments 25 to 39, wherein the configuring node is a software-defined network, SDN, controller.

41. The method according to any one of embodiments 25 to 38, wherein the configuring node is a switch in the wired communication network.

42. The method according to any one of embodiments 25 to 41, wherein the core network node implements an application function.

43. The method according to any one of embodiments 25 to 42, wherein the wired communication network is an Ethernet network.

44. The method according to any one of embodiments 25 to 43, wherein the data streams comprise time-sensitive networking data streams.

45. The method according to any one of embodiments 25 to 44, wherein the wireless communication network comprises a cellular network.

46. A core network node, configured to perform the method according to any one of embodiments 1 to 24.

47. A core network node, comprising:
processing circuitry, configured to perform the method according to any one of embodiments 1 to 24.

48. The core network node according to embodiment 47, further comprising power supply circuitry, configured to supply power to the core network node.

49. A core network node, comprising processing circuitry and a non-transitory computer-readable medium storing instructions which, when executed by the processing circuitry, cause the core network node to perform the method according to any one of embodiments 1 to 24.

50. A configuring node, configured to perform the method according to any one of embodiments 25 to 45.

51. A configuring node, comprising:
processing circuitry, configured to perform the method according to any one of embodiments 25 to 45.

52. The configuring node according to embodiment 51, further comprising power supply circuitry, configured to supply power to the configuring node.

53. A configuring node, comprising processing circuitry and a non-transitory computer-readable medium storing instructions which, when executed by the processing circuitry, cause the core configuring network node to perform the method according to any one of embodiments 25 to 45.

The invention claimed is:

1. A method in a core network node for a wireless communication network, the method comprising:
receiving a configuration message via an interface with a configuring node associated with a wired communication network, the configuration message comprising settings for a plurality of paths between a first node coupled to the wired communication network and a second node coupled to the wireless communication network, the plurality of paths carrying a plurality of data streams between the first and second nodes, the plurality of data streams comprising at least one redundant data stream;

configuring the plurality of paths within the wireless communication network according to the settings;

receiving a request message via the interface with the configuring node, the request message comprising a request for information related to a topology of the wireless communication network; and transmitting an information message via the interface with the configuring node, the information message comprising information related to the topology of the wireless communication network.

2. The method according to claim 1, wherein the information message further comprises an indication of a capability of the wireless communication network to provide multiple paths for redundant data streams.

3. The method according to claim 1, further comprising:

converting the settings, for each of the plurality of paths, into one or more of: a packet filter set; and one or more forwarding rules; and forwarding, for each of the plurality of paths, the one or more of the packet filter set and the one or more forwarding rules to a second core network node for the wireless communication network.

4. The method according to claim 3, wherein the second core network node implements a session management function.

5. The method according to claim 1, wherein the plurality of paths comprises a first path and a second path which have at least one element in common with each other in the wireless communication network.

6. The method according to claim 5, wherein the first path and the second path are identical in the wireless communication network.

7. The method according to claim 1, wherein the plurality of paths comprises a third path and a fourth path which have at least one element not in common with each other in the wireless communication network.

8. A method in a configuring node for a wired communication network, the method comprising:

transmitting a request message via an interface with a core network node for a wireless communication network, the request message comprising a request for information related to a topology of the wireless communication network;

receiving an information message via the interface with the core network node, the information message comprising information related to the topology of the wireless communication network;

receiving a request message from a first node coupled to the wired communication network, to establish a connection between the first node and a second node coupled to the wireless communication network; and sending a configuration message via the interface with the core network node, the configuration message comprising settings for a plurality of paths between the first node and the second node, the plurality of paths carrying a plurality of data streams between the first and second nodes, the plurality of data streams comprising at least one redundant data stream.

9. The method according to claim 8, wherein the information message further comprises an indication of a capability of the wireless communication network to provide multiple paths for redundant data streams.

10. The method according to claim 9, wherein the plurality of paths comprises a first path and a second path which have at least one element in common with each other in the wireless communication network.

11. The method according to claim 10, wherein the first path and the second path are identical in the wireless communication network.

12. The method according to claim 8, wherein the plurality of paths comprises a third path and a fourth path which have at least one element not in common with each other in the wireless communication network.

13. A core network node, comprising processing circuitry and a non-transitory computer-readable medium storing instructions which, when executed by the processing circuitry, cause the core network node to:

receive a configuration message via an interface with a configuring node associated with a wired communication network, the configuration message comprising settings for a plurality of paths between a first node coupled to the wired communication network and a second node coupled to the wireless communication network, the plurality of paths carrying a plurality of data streams between the first and second nodes, the plurality of data streams comprising at least one redundant data stream;

configure the plurality of paths within the wireless communication network according to the settings;

receive a request message via the interface with the configuring node, the request message comprising a request for information related to a topology of the wireless communication network; and transmit an information message via the interface with the configuring node, the information message comprising information related to the topology of the wireless communication network.

14. A configuring node, comprising processing circuitry and a non-transitory computer-readable medium storing instructions which, when executed by the processing circuitry, cause the configuring node to:

transmit a request message via an interface with a core network node for a wireless communication network, the request message comprising a request for information related to a topology of the wireless communication network;

receive an information message via the interface with the core network node, the information message comprising information related to the topology of the wireless communication network;

receive a request message from a first node coupled to the wired communication network, to establish a connection between the first node and a second node coupled to the wireless communication network; and send a configuration message via the interface with the core network node, the configuration message comprising settings for a plurality of paths between the first node and the second node, the plurality of paths carrying a plurality of data streams between the first and second nodes, the plurality of data streams comprising at least one redundant data stream.

* * * * *